United States Patent
Draaijer et al.

(10) Patent No.: US 9,509,418 B2
(45) Date of Patent: Nov. 29, 2016

(54) WIRELESS DOCKING LINK BUDGET OPTIMIZATION SYSTEM

(71) Applicant: KONINKLIJKE PHILIPS N.V., Eindhoven (NL)

(72) Inventors: Maurice Herman Johan Draaijer, Eindhoven (NL); Franciscus Antonius Maria Van De Laar, Eindhoven (NL); Koen Johanna Guillaume Holtman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 203 days.

(21) Appl. No.: 14/371,549

(22) PCT Filed: Jan. 4, 2013

(86) PCT No.: PCT/IB2013/050079
§ 371 (c)(1),
(2) Date: Jul. 10, 2014

(87) PCT Pub. No.: WO2013/105005
PCT Pub. Date: Jul. 18, 2013

(65) Prior Publication Data
US 2014/0354226 A1 Dec. 4, 2014

Related U.S. Application Data

(60) Provisional application No. 61/586,357, filed on Jan. 13, 2012.

(51) Int. Cl.
*H04B 1/06* (2006.01)
*H04B 15/00* (2006.01)
*G06F 1/16* (2006.01)
(Continued)

(52) U.S. Cl.
CPC ............. *H04B 15/00* (2013.01); *G06F 1/1632* (2013.01); *G06F 1/1698* (2013.01); *G06F 1/263* (2013.01); *H02J 7/025* (2013.01); *H04B 1/401* (2013.01); *H04B 5/0031* (2013.01); *H04B 5/0037* (2013.01); *H04B 7/0805* (2013.01); *H02J 7/0042* (2013.01)
(Continued)

(58) Field of Classification Search
CPC .... G06F 1/1632; G06F 1/1698; G06F 1/263; H02J 7/025
USPC ................ 455/573, 78, 83, 272, 274, 277.1, 455/575.7; 320/108; 307/104
See application file for complete search history.

(56) References Cited

U.S. PATENT DOCUMENTS 6,021,317 A 2/2000 Irvin
8,278,784 B2 * 10/2012 Cook ................... H01Q 1/2225
307/149

(Continued)

FOREIGN PATENT DOCUMENTS

WO WO9723063 A1 6/1997
WO WO2004075471 A2 9/2004

*Primary Examiner* — Tuan Pham
(74) *Attorney, Agent, or Firm* — Larry Liberchuk

(57) ABSTRACT

A wireless docking station (100) for docking with a wireless mobile device (120), the wireless docking station including: a platform (110) for docking with the wireless mobile device (120); an interface (230) to a radio; a plurality of antennas (221, 222, 223, 224, 225); an antenna switch (220); a signal sensor (210); and a control unit (240); wherein the control unit (240) controls the antenna switch (220) to connect one of the plurality of antennas (221, 222, 223, 224, 225) to the interface (230) based on signals transmitted from the docked wireless device and detected by the signal sensor (210).

9 Claims, 3 Drawing Sheets

(51) Int. Cl.
  *G06F 1/26*   (2006.01)
  *H04B 5/00*   (2006.01)
  *H04B 7/08*   (2006.01)
  *H02J 7/02*   (2016.01)
  *H04B 1/401*  (2015.01)
  *H02J 7/00*   (2006.01)

(56) References Cited

U.S. PATENT DOCUMENTS

| | | | |
|---|---|---|---|
| 2007/0120752 A1* | 5/2007 | Takasu | G06F 1/1616 343/702 |
| 2007/0182367 A1 | 8/2007 | Partovi | |
| 2008/0211458 A1* | 9/2008 | Lawther | H02J 7/025 320/132 |
| 2009/0096413 A1 | 4/2009 | Partovi | |
| 2009/0298553 A1 | 12/2009 | Ungari | |
| 2010/0039066 A1 | 2/2010 | Yuan | |
| 2010/0041333 A1 | 2/2010 | Ungari | |
| 2010/0057969 A1 | 3/2010 | Meiri | |
| 2010/0081473 A1 | 4/2010 | Chatterjee | |
| 2010/0231473 A1* | 9/2010 | Shtrom | H01Q 1/2291 343/757 |
| 2012/0214462 A1* | 8/2012 | Chu | H04M 19/04 455/418 |

* cited by examiner

WIRELESS DOCKING LINK BUDGET OPTIMIZATION SYSTEM

This invention relates to wireless docking and, more particularly, to a wireless docking system and device for link budget optimization.

The future of connecting mobile devices to peripherals is expected to be wireless. There are common communications standards being used for mobile devices, such as Wi-Fi, or BLUETOOTH (trademark). If a user wants to stream contents from the mobile device to a TV screen, the only commonly available options are Wi-Fi 802.11a/b/g/n standards. Unfortunately the current wireless standards, such as Wi-Fi, suffer from interference from other devices. These standards use unlicensed bands in the 2.4 GHz and 5.2 GHz range, and the availability and performance of such bands are not guaranteed. This means that, in practice, bandwidth performance is heavily dependent on activities in these free bands. Not only Wi-Fi equipment but also video links, microwave ovens and many other devices operate in the same spectrum. Therefore, there is a need to optimize the link budget for devices operating in such environment. Note that a link budget is the accounting of all of the gains and losses from the transmitter, through the medium, to the receiver in a telecommunication system.

Due to the above problem, solutions which decrease this interference and increase the link budget of the connection between mobile devices and these peripherals are of great value. By applying these solutions the quality of, for instance, video streaming from a mobile device to a screen will increase significantly.

Another related technology is wireless charging. Wireless charging pads are well known. Typically a wireless charging pad contains a charging coil which couples with a charging coil in a mobile device to be charged through electromagnetic induction. The induced current on the mobile device's charging coil charges the battery in the mobile device.

To circumvent the above problem of link budget optimization, the link budget can be increased in certain situations, for instance, when charging the mobile device. Normally, the mobile device is connected to an access point nearby while charging on a wired or wireless charging unit or pad. Therefore, if the charging pad is modified to become a charging and docking pad by equipping the charging pad with link budget optimization circuitry or components, the link budget can be increased at the same time the mobile device is being charged. This takes into account the fact that when the mobile device is placed on such docking pad, the distance between the antenna in the mobile device and antenna in the docking pad can be minimized, resulting in minimal signal losses between the dockee and the docking station. Thus, a pad that combines the wireless charging function and the wireless docking station function into one single unit is of great value and convenience to users. Note that in general, a docking station can be realized in different shapes and forms, such as a pad, cradle, slot, etc. When a docking station is realized as a pad, the docking station may be referred to as a docking pad.

However, a charging pad normally just has a flat surface for receiving a mobile device, without any structure to direct the optimal placing of the mobile device. Therefore, the mobile device may be placed arbitrarily anywhere on the pad and may be at any arbitrary orientation. A wireless docking station that has a pad for docking with a dockee faces the challenge that the distance and orientation between the antenna in the dockee and the antenna in the docking station may not be optimal due to the arbitrary placing of the dockee on the pad. As a result, the link budget between the dockee and the docking station may not be optimized.

Certain embodiments described herein describe an antenna design in a wireless docking environment which can be optionally combined with wireless charging. Certain embodiments advantageously provide wireless charging during an optimized video streaming or data transfer under the current Wi-Fi standards. One advantage of the proposed antenna design is that the link budget can still be significantly increased even if the dockee is arbitrarily placed on the docking station.

Another advantage of the present invention is that the link budget can be increased significantly without changing the characteristics of the mobile device. Advantageously, certain embodiments may be implemented on any mobile device, independent of brand, type or Wi-Fi standard, such as 802.11 a/b/g/n.

In one embodiment, the invention described herein relates to a wireless docking station for docking with a wireless device, the wireless docking station including: a platform for docking with the wireless device; an interface to a radio; a plurality of antennas; an antenna switch; and a signal sensor, such that when the wireless device is docked to the wireless docking station, the antenna switch connects one of the plurality of antennas to the interface based on signals transmitted from the docked wireless device and detected by the signal sensor.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

WIRELESS DOCKING

Figure 1:
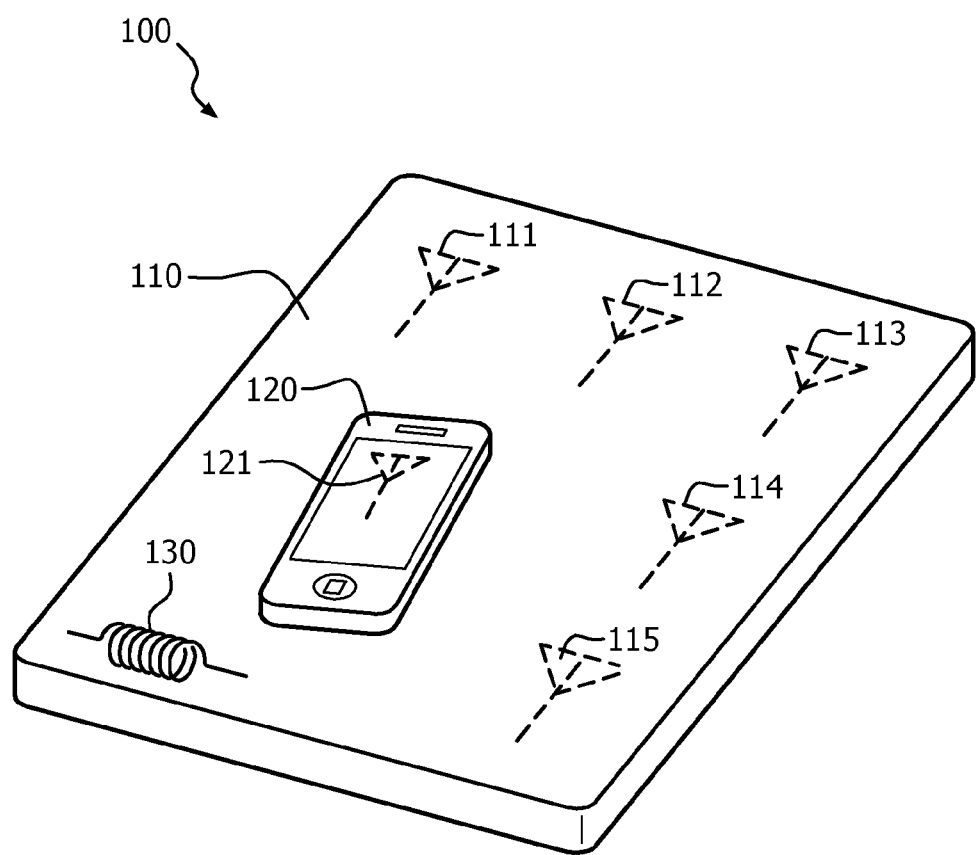
FIG. 1 shows a wireless device docked with a wireless docking station according to an embodiment of the invention.

Wireless docking uses wireless technologies to connect portable devices such as mobile phones, laptops, etc. to typically stationary docking environments. Such a portable device is called a dockee or wireless dockee. The wireless docking environment gives the dockee access to peripherals, such as a large screen, a keyboard, a mouse, and input/output ports that can be used to improve the experience and the productivity of the end user when interacting with applications running on the dockee. One example for wireless docking is to give the user of a mobile phone the ability to use a bigger screen, such as a TV or PC monitor, when interacting with an application, such as an e-mail client or a web browser, running on the mobile phone.

To realize wireless docking, the dockee connects wirelessly to one or more wireless docking stations, also known as wireless docking hosts, in order to gain access to the peripherals in the wireless docking environment. In the most simple case, the wireless docking environment is realized by having at a location (in a living room, on a desk in an office, etc.) a single wireless docking station, to which peripherals like TVs, PC monitors, keyboards, etc. are all connected. In one specific example, a Bluetooth wireless keyboard and a USB webcam could be connected to a docking station in order to become part of a docking environment. Thus, the dockee would be connected to the wireless keyboard and USB webcam after docking with the docking station.

In practical terms, Wi-Fi will be the most logical wireless protocol to enable wireless docking between the docking station and the dockee device, as many (potential) dockee devices come with Wi-Fi support already built-in. However, a full wireless docking system that aims to ensure cross-device and cross-manufacturer compatibility between different dockees and docking stations in a user-friendly way is further defined by a set of mechanisms or protocols between dockees and docking stations that realize easy and convenient automatic Wi-Fi connection setup between the dockee and the docking stations with their associated peripherals.

In the wireless docking environment, the state of 'being docked', the docked state, is, in this context, the state where a dockee has access to the peripherals in the wireless docking environment, or at least to the peripherals in the wireless docking environment that the dockee has chosen to access. The grouping of many peripherals into a single wireless docking environment and allowing the user to connect the dockee with these peripherals in the wireless docking environment by initiating a single 'dock' action is a key concept to enable ease of use. The state of being 'undocked' is a state where there is no access to the peripherals in the wireless docking environment. Preferably, the docking and undocking procedures are both as automatic as possible, requiring minimal user intervention and minimal prior configuration by a user.

A docking station could be realized in many ways. It could be a specially designed single-purpose device, or it could be, e.g., a PC running some software applications, which may have some extra hardware attached to make docking more convenient and/or efficient. A HDTV might also have built-in functionality to act as a docking station. One design option that is considered for all these classes of docking stations is to equip the station with a cradle, in which the dockee can be placed. The placing of the dockee in the cradle will generally have the effect of triggering a dock action. Another option is to equip the docking station with a docking pad, a surface onto which the dockee can be laid down. Again, the laying down would trigger a dock action, at least when the dockee was in the undocked state prior to laying down.

Equipping a docking station with a cradle, pad, or other demarcated area has the advantage that if a single room or single area in a building contains many docking stations within potential wireless range, there will be an easy way for a user to indicate which station and implied wireless docking environment the user wants to dock with. Another trigger action may be by using a menu on the dockee device. For example, in, e.g., a living room, when a user is sitting in a chair with the dockee device in their hand, it would be convenient to trigger a docking action with a docking station that is not within arm's reach, by a using a menu on the dockee. Additional triggers to get from an undocked to a docked state include (a) the scanning of an NFC (Near Field Communication) tag on a docking station by a dockee, or by (b) the user pressing a specific button on the dockee, or (c) on the docking station. A maximally useful wireless docking standard should enable many of these types of trigger actions, giving device manufacturers and end users the choice to select what is most convenient for them.

To create maximum user friendliness, the triggering of an 'undock' action should not always be the inverse of a triggering of a 'dock' action. For example, if docking can be initiated automatically by the user placing a mobile phone dockee on a docking pad, then it may not be convenient if undocking happens automatically when the user picks up the mobile phone to answer a call. A Wi-Fi link between the phone and the docking station can be maintained just as well when the user has picked up the phone from the docking pad, though in some cases the throughput of the link may suffer by the user blocking a direct signal path with their body.

If a dockee is laid on a docking pad, is positioned in a cradle, or is placed by the user inside an area (physically demarked, or just known to exist) that is associated with a docking station or docking environment, the dockee is considered to have the state of being 'physically docked.' If a dockee enters the state of being physically docked, this may trigger a docking action, resulting in the dockee also becoming logically docked. If the dockee leaves the state of being physically docked, it might not necessarily stop being logically docked.

Physical docking could be done by a user for a number of reasons, and several of these reasons may apply at the same time:

1. To trigger a logical docking process.
2. To ensure that the dockee is connected to a power source, e.g. wireless charging by placing a phone on a charging pad.
3. To optimize, or make more predictable, the quality of the wireless communication between the dockee and the docking station/docking environment. The quality (speed, latency) and predictability of the communication will after all have an effect on utility of the combination of the dockee with the peripherals in the docking environment.
4. To create an input to a security mechanism, so that (a) the docking process can proceed more securely, and/or (b) the docking process can omit some security dialog steps that the user would have to go through otherwise when logically docking from a distance. Wireless connections can be subject to man-in-the-middle attacks by which a (remote) attacker with the right equipment can impersonate being a dockee to a docking station, or a docking station to a dockee. While well-known mechanisms like pin code authentication (from Bluetooth) can lower the chance of successful attacks, these are not user-friendly. Physical docking, with a detection mechanism for physical docking that is hard for a remote man-in-the-middle attacker to influence is, therefore, an important route to enhancing security but should not be at the expense of user friendliness.

Several important process elements are identified for the process that leads from an undocked to a docked state. These process elements do not have to occur in a fixed order, nor have to occur always for every type of envisaged docking process. Some of these elements are:

1. A trigger or kickoff mechanism/event that gets the docking process going, where this trigger may select a single wireless docking environment among multiple wireless docking environments that are all in wireless range.
2. The creation of one or more secure wireless connections between the dockee and docking station(s) or other elements in the docking environment, with the initialization of these secure connections often relying on 'trust relation creation/detection' mechanisms that guard against a man-in-the-middle attack.

3. The selection of optimal wireless protocols and interface settings to use for communications to and from peripheral functions in the docked state, e.g. Wi-Fi channel.

In one embodiment of the invention, the wireless docking station includes a switchable antenna array. Although not required, ideally, the switchable antenna array is combined with a wireless charging pad, thereby providing simultaneous battery charging and link budget optimization.

In another embodiment of the invention, the docking station includes a directional antenna beam directed towards the mobile device. Since the radio signal from the docking station is directional, the radio energy losses in other directions are minimized. In this way, the link budget between a docking station and the mobile device is optimized. Note that phase shifters and other radio circuitry and components are required in order to create such a directional beam, as known by one of ordinary skill in the art.

In one embodiment, a switchable antenna array in a wireless docking station designed for short range connections is used. An antenna among a plurality of antennas in the switchable antenna array is used to communicate with an antenna inside the mobile device. The selected antenna is optimally located very close to the point where the mobile device holds its antenna.

The wireless docking station has a platform for the mobile device to dock. The platform can simply be a flat surface on which a mobile device can rest. Alternatively, the platform may have slots or be of certain shapes to allow the docking to take place by inserting the mobile device into the slots or orienting the mobile device in a specific orientation and location in the docking station.

In one embodiment, the switchable antenna array is located below the surface of the wireless docking station to minimize the distance between the mobile device's antenna and the switchable antenna array in the docking station. By selecting the antenna or antennas of the switchable antenna array that are the closest to the antenna of the mobile device, the link budget can be increased. Note, however, that since the link budget can be affected by the distance as well as the angle between antennas, depending on the orientation of the mobile device with respect to the antennas in the docking station, the antenna that provides optimum link budget may not be the one that is the closest in distance to the mobile device's antenna.

In one embodiment, a signal sensor is used to determine the antenna that provides the optimum link budget. The signal sensor may employ a number of radio receivers to detect radio signals from the dockee to determine the location and orientation of the antenna of the dockee. Known techniques, such as triangulation, may be used to make such determination. In another embodiment, at least some of the antennas in the docking station are also used as radio receivers for the signal sensor.

In another embodiment, each of the antennas in the docking station may be used one-by-one to couple with the antenna of the dockee in order to select the antenna that results in optimal link budget.

FIG. 1 depicts a mobile device 120 docked with a docking station according to an embodiment of the invention. The docking station is realized as a docking pad 100. The mobile device 120, which contains an antenna 121, is positioned on the surface 110 of the docking pad 100. The docking pad 100 may also serve as a charging pad if a charging coil 130 is included in the pad. There are a plurality of antennas 111, 112, 113, 114, and 115 arranged underneath the surface 110.

In an embodiment, one of the plurality of antennas 111, 112, 113, 114, and 115 is selected to communicate with the mobile device's antenna 121.

Figure 2:
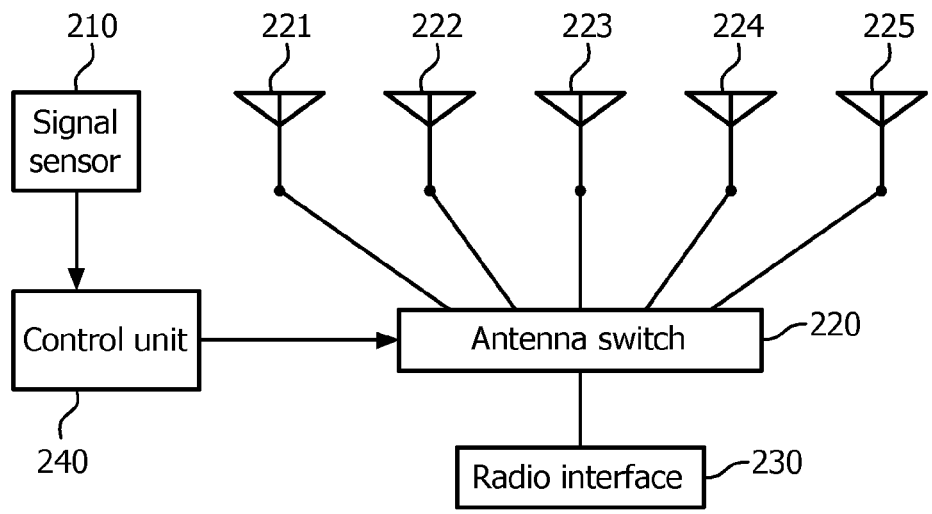
FIG. 2 shows components of a wireless docking station according to an embodiment of the invention.

FIG. 2 shows a switchable antenna array that is applicable to the docking station in FIG. 1 according to an embodiment of the invention. An antenna switch 220 connects a radio interface 230 with one of the plurality of antennas 221, 222, 223, 224, and 225. The radio, for example, can be a Wi-Fi device or a Wi-Fi direct access point, which provides the 802.11a/b/g/n signals. The signals are transported to the selected antenna by the antenna switch 220. A control unit 240, together with a signal sensor 210, is used to determine which of the plurality of antennas 221, 222, 223, 224, and 225 will be switchably connected to the radio interface 230 by the antenna switch 220. Note that at least some of the antennas 221, 222, 223, 224, and 225 can also be a part of the signal sensor, because each can sense the signal strength and quality from the mobile device's antenna. The sensed signals may also be obtained by connecting each of the antennas 221, 222, 223, 224, and 225 in turn with the dockee. Based on the sensing results from the signal sensor 210, the control unit 240 determines which antenna to use and issues a switching command to the antenna switch 220 to connect with the radio interface 230.

Figure 3:
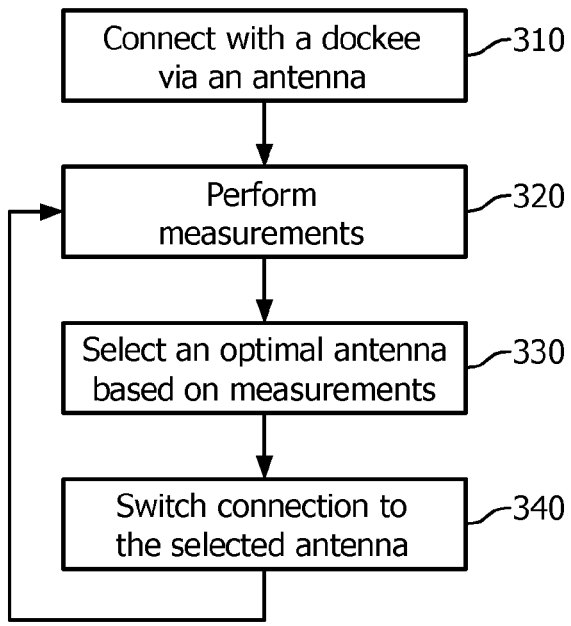
FIG. 3 shows a docking process flow according to an embodiment of the invention.

FIG. 3 shows the docking process flow according to an embodiment of the invention.

At 310, an antenna in the docking station is used to connect with the antenna in the dockee. The antenna used in the docking station can be arbitrarily chosen, such as a default antenna. This antenna provides a connection between the dockee and the docking station without having to wait for the completion of the antenna selection process, although the link budget may not be optimal in this case. Therefore, a data flow between the dockee and the docking station may already be in progress, while the antenna selection process is taking place.

Optionally, step 310 can be omitted to simplify the implementation of the docking process. However, in this case the data flow occurs only after the selection of the antenna is completed.

At 320, measurements are performed.

In one embodiment, the sensor measures the signal strength of the received signal to select the optimal antenna. In another embodiment, the sensor measures the latency of the signals. Note that most standard Wi-Fi chipsets can provide signal strength and/or delay measurement functions, whereby no additional hardware is needed, although a separate circuit for amplitude and/or timing measurement is also contemplated in another embodiment. The signal strength measurements or delay measurements can be performed by waiting for the beacon signal of the dockee at one-antenna-at-a-time for at least some, if not all, of the antennas in the docking station.

The sensor may measure the location of the dockee. Since sound waves travel relatively slowly in this docking environment, it is less complicated to localize an object using acoustic principles. In one embodiment, a unique sound, for easy identification, is used to determine the location of the dockee. However, this approach would require additional acoustic hardware.

A combination of at least some the above measurements may also take place.

At 330, the antenna in the docking station that provides the optimal link budget is selected using the sensor measurements. In one embodiment, the antenna with the strongest signal strength is selected. In another embodiment, the antenna with the shortest latency is selected. In another embodiment, the antenna that is closest to the location of the dockee is selected. It is also contemplated that a selection criterion based on a combination of the above factors may be used to select the antenna. For example, between two antennas that provide comparable signal strengths, the one with the shortest latency is selected.

At 340, the docking station switches the connection to the selected antenna if a connection using another antenna already exists (at 310). If 310 is optionally omitted, a connection is established between the dockee and the docking station with the antenna in the dockee and the selected antenna in the docking station.

Note that the selected antenna may no longer be the optimal antenna if, for example, the user has moved the dockee to a different spot on the docking station. FIG. 3 also shows, in one embodiment, a loop between 340 and 320 where sensor measurements are taken continuously or periodically to ensure that the optimal antenna is selected and used.

One advantage of certain embodiments herein is that many standard components can be used without much, if any, customization. Antenna switching units, such as the antenna switch 220 shown in FIG. 2, are well known and widely used in many wireless applications. For example, using a switching unit for switching between a and b/g frequency bands having frequencies 2.5 GHz and 5.2 GHz, respectively, is a well-known technique and broadly applied. Switching components, such as the PHEMT GaAs SPDT Switch (AS213-92, AS213-92LF), manufactured by SKYWORKS (trademark) is capable of switching Wi-Fi signals.

Figure 4:
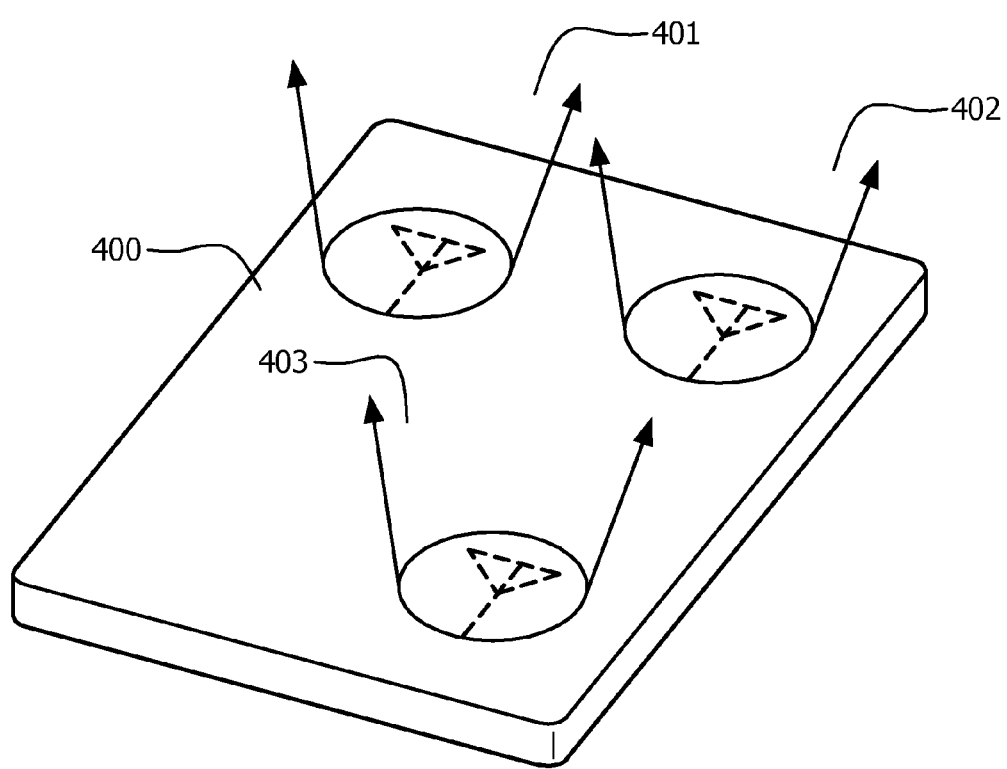
FIG. 4 shows ranges of directional radio beams of a wireless docking station according to an embodiment of the invention.

FIG. 4 shows, according to an embodiment of the invention, the docking pad 400 creating a plurality of radio beams 401, 402, 403 towards the mobile device resting on the pad surface. Particularly, these beams are created over the areas where the antennas are positioned. If the antennas are directional, then the radio beams can be better directed towards the mobile device. Implementing directional antennas may result in a much improved link budget.

If more than one device is placed on the pad, more antennas can be activated simultaneously. Note that in this case the impedance has to be matched. In addition, the signal strength would have to be matched because the emitted energy is lower per antenna. Based on the number of dockees detected, the control unit also will control the circuitry to provide proper impedance and radio power.

In another embodiment, the link budget between a dockee and the docking station may be enhanced by using multiple antennas in the docking station by means of MIMO enabled beam steering or suppression of multipath fading. However, this would require extra hardware to support phase arrays or time information between the multiple antennas.

The plurality of the antennas in the antenna array may be of different types, sizes and shapes. For example, an antenna may be a monopole, dipole, or coil. In one embodiment, a selection of a specific type of antenna is duplicated over a wide surface, for instance a wireless charging pad, in order to create an array of antennas underneath the pad. In addition, there are shapes with certain behavior for link budget optimization. For example, in another embodiment, a capacitive antenna formed by two parallel conductive plates is used. The coils of a charging pad may also be utilized as antennas. However, such coils are typically optimized for wireless charging and are usually less efficient in making a good Wi-Fi link budget, because they are based on a much lower frequency and mainly for H-type electromagnetic waves. In a preferred embodiment, antennas designed for E-type electromagnetic waves are implemented.

Moreover, other antenna materials can be applied, such as ceramic material. Due to different propagation speeds, these different materials will have different sizes at the optimum frequency, and therefore also provide design advantages.

This invention is applicable to wireless docking, as well as other situations in which a wireless connection needs to be made in a crowded radio environment, where the user has the liberty to place their wireless device in a certain fixed location.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A wireless docking station for docking with a wireless mobile device, the wireless docking station comprising:
   a platform for docking with the wireless mobile device;
   an interface to a radio;
   a plurality of antennas;
   an antenna switch;
   a radio signal sensor; and
   a control unit, wherein the platform is a docking pad comprising the plurality of antennas arranged under the surface of the docking pad; and the control unit controls the antenna switch to connect one of the plurality of antennas to the interface based on radio signals detected from the docked wireless mobile device by the radio signal sensor.

2. The wireless docking station of claim 1, wherein the plurality of antennas are directional antennas.

3. The wireless docking station of claim 1, wherein the plurality of antennas are part of the radio signal sensor.

4. The wireless docking station of claim 1, wherein the platform is a flat surface on which the mobile wireless device rests.

5. The wireless docking station of claim 1, further comprising a charging coil for charging batteries in wireless mobile devices equipped with induction charging capabilities.

6. The wireless docking station of claim 1, wherein more than one of the plurality of antennas are connected to the interface if more than one wireless mobile device is docked with the wireless docking station.

7. A method for wirelessly docking a dockee with a docking station, wherein the docking station comprises a plurality of antennas for connecting with the dockee, the method comprising:
   sensing radio signals from the dockee on a surface of a docking pad via the plurality of antennas, the plurality of antennas being arranged under the surface of the docking pad;
   selecting an antenna from the plurality of antennas based on the sensing; and
   connecting with the dockee using the selected antenna.

8. The method according to claim 7, further comprising connecting with the dockee with one of the plurality of antennas before the sensing.

9. The method according to claim 7, wherein the sensing comprises at least one of:
   signal strength measurements at each of the plurality antennas;
   latency measurements at each of the plurality antennas; and
   location measurements of the dockee.

\* \* \* \* \*